July 24, 1962 — W. F. SCHMITZ — 3,046,002
COMBINATION SHOCK ABSORBER AND AIR SPRING
Filed Aug. 30, 1960

INVENTOR.
William F. Schmitz
BY
His Attorney

United States Patent Office 3,046,002
Patented July 24, 1962

3,046,002
COMBINATION SHOCK ABSORBER
AND AIR SPRING
William F. Schmitz, Dayton, Ohio, assignor to General Motors Corporation, Detroit, Mich., a corporation of Delaware
Filed Aug. 30, 1960, Ser. No. 52,950
4 Claims. (Cl. 267—64)

This invention relates to a combination shock absorber and supplementary air spring unit assembly that is adapted to be placed between the sprung mass and the unsprung mass of a vehicle in the same position in which a conventional shock absorber alone is normally disposed adjacent the main suspension spring for the vehicle, the supplementary air spring unit being adapted to aid the main spring in support of the sprung mass of the vehicle on the unsprung mass with the shock absorber functioning in normal manner.

The combination unit comprising a direct-acting tubular type shock absorber supporting an auxiliary air spring to work in combination therewith may be positioned adjacent each of the main springs of a vehicle, if desired, but they are adapted for use mainly adjacent the two rear springs of the vehicle to aid the rear springs in support of the sprung mass of the vehicle on the unsprung mass when air or gas is admitted into the auxiliary air spring units. The air spring on the shock absorber is constructed and arranged in a manner that it will not cause any substantial change in ride effect on the vehicle or change of ride effect in the normally engineered spring suspension for the vehicle. However, when a heavier-than-normal load is carried by the vehicle, or even when carrying a heavy load of passengers, air or other gas can be supplied into the auxiliary air spring units so that the main suspension spring of the vehicle will be aided by the auxiliary air spring units in the suspension of the vehicle. This arrangement does two things, that is, increases the overall load carrying capacity of the suspension system for the vehicle and resists "bottoming" of the vehicle, as well as providing the operator of the vehicle with a means which can maintain the vehicle in a normal level condition relative to the road so that the headlights of the vehicle will not be thrown into the air and into the eyes of oncoming drivers.

The auxiliary air spring unit for the shock absorber may consist of a resilient tubular wall that cooperates with the shock absorber itself to form a gas chamber around the shock absorber which can be filled with air or other suitable gas under pressure. However, the flexible resilient wall tends to "balloon out" creating the disadvantage of tending to restrain the extension movement of the shock absorber and thereby effect the normal shock absorber action, as well as require a greater space for installation of the combination unit. Also, the unsupported wall of the air spring is more susceptible to rupture on admission of high-pressure fluid.

It is therefore an object of this invention to provide a combination shock absorber with a supplementary air spring unit having a flexible resilient wall wherein a suitable support is provided for the resilient wall of the air spring unit during the entire stroke of reciprocation of the shock absorber. This can be accomplished by providing a tubular cylinder around the shock absorber so that the inner wall of the air spring unit is supported on the reservoir tube of the shock absorber and the outer wall of the air spring unit is supported on the tubular member that reciprocates with the rod of the shock absorber.

Further objects and advantages will be apparent from the drawings and the following description.

Figure 1:
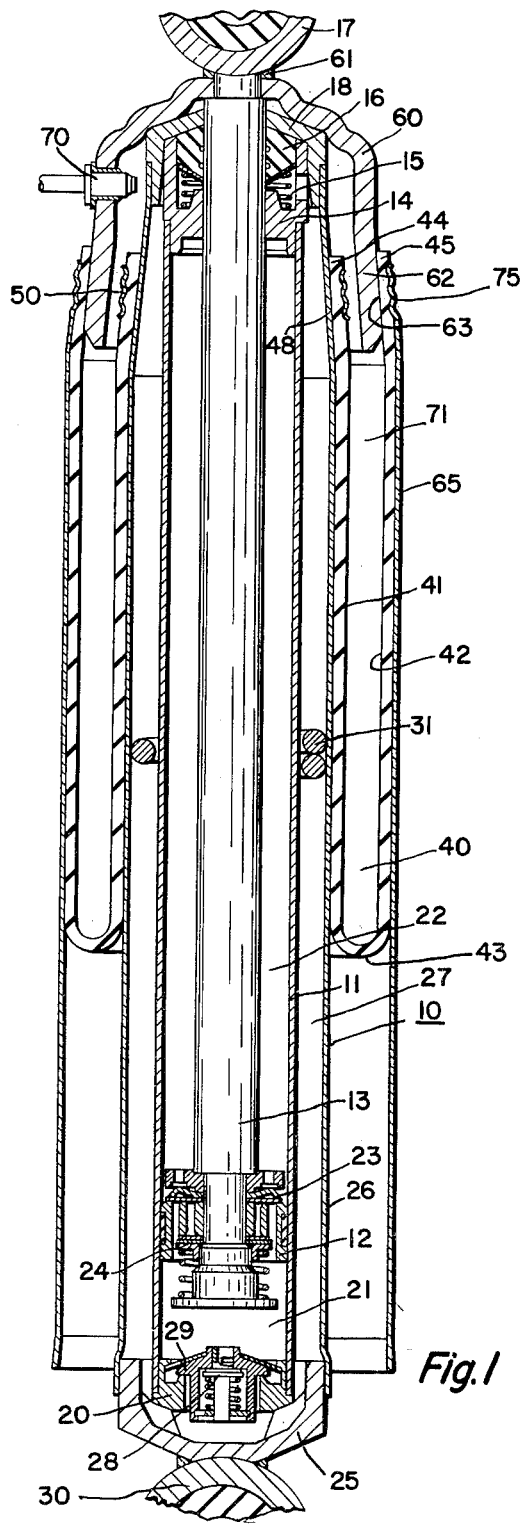
FIGURE 1 illustrates a vertical cross-sectional view of a combination shock absorber and air spring unit incorporating features of this invention wherein the shock absorber is shown in the completely collapsed position.

In this invention, in FIGURE 1, there is illustrated a shock absorber and an air spring unit assembly that is adapted to be placed between the sprung mass and the unsprung mass of a vehicle in the same location that a conventional direct-acting shock absorber is placed normally, that is adjacent the main spring of the vehicle suspension so that the air spring unit can aid the main vehicle suspension spring when the air spring unit is pressurized with air or other suitable gas. The shock absorber will function in its normal manner to damp movements of the sprung and unsprung masses without any substantial interference from the air spring unit portion of the assembly when the air spring is not pressurized. The air spring unit of the combination shock absorber and air spring will be pressurized with air under pressure or other gas when the load is carried by the vehicle which tends to cause sagging of the rear of the vehicle relative to the unsprung mass. Under this condition air is pressurized into the air spring unit to establish a substantially level condition of the vehicle relative to the ground by proportioning the air pressure in the air spring unit to the load carried in the vehicle. Even when pressurized, the air spring unit will not substantially affect the normal shock absorbing function of the shock absorber, and will in no way affect the operation of the normal valving of the shock absorber.

In air spring units of this character there is a tendency for the air spring to "balloon out" when pressurized so that it takes up more space than is desirable and is more susceptible to rupture at high pressure when accidentally applied into the air spring unit. Also, the stretch applied in the flexible wall of the air spring unit tends to resist extension of the shock absorber when the wall is unconfined or uncontrolled.

The shock absorber 10 consists of a pressure cylinder 11 having a valved piston 12 carried on the end of a reciprocating rod 13. The reciprocating rod 13 extends through a rod guide member 14 at one end of the cylinder 11, the rod guide member having a rod seal chamber 15 that receives a rod seal 16 engaging the rod and sealing against loss of hydraulic fluid from within the shock absorber pressure cylinder 11. The projecting end of the rod 13 carries a fitting 17 adapted to be attached to the sprung mass or chassis of the vehicles for attaching this end of the shock absorber to the vehicle. The seal chamber 15 is closed by a cap member 18 that holds the rod seal 16 within the chamber 15.

The bottom end of the cylinder 11 is closed by a base valve 20 so that a compression chamber 21 is formed between the base valve 20 and the piston 12. A rebound chamber 22 is formed between the piston 12 and the rod guide 14.

The piston 12 is provided with a compression control valve 23 on one side of the piston to regulate flow of hydraulic fluid from the chamber 21 into the chamber 22 on movement of the piston 12 towards the base valve 20. On the opposite side of the piston 12 there is provided the rebound valve 24 that controls flow of hydraulic fluid from chamber 22 into the chamber 21 when the piston moves away from the base valve 20. The base valve 20 is carried in a closure cap 25 that is secured within one end of the reservoir tube 26 coaxial with the pressure cylinder tube 11 and spaced from the cylinder tube. The upper end of the reservoir tube 26 is fixedly attached to the closure cap 18, thereby providing a closed fluid reservoir space 27 between the pressure cylinder tube 11 and the reservoir tube 26.

The base valve 20 has a valve member 28 that controls flow of hydraulic fluid from the compression chamber 21 into the reservoir chamber 27 on movement of the piston 12 toward the base valve 20. The base valve also includes a valve member 29 that provides for relatively free flow of hydraulic fluid from the reservoir chamber 27 back into the compression chamber 21 on movement of the piston 12 away from the base valve. The closure cap 25 carries a fitting 30 adapted to attach the lower end of the shock absorber to the unsprung mass of the wheel and axle structure of the vehicle, the fitting members 30 and 17 providing for attachment of the shock absorber and air spring unit assembly between the sprung mass and the unsprung mass of the vehicle and adjacent the main suspension spring for the vehicle in the same position normally occupied by the shock absorber alone.

A baffle ring 31 is provided in the reservoir chamber 27 to reduce agitation of the oil and therefore reduce frothing.

The air spring unit assembly 40 of the combination shock absorber and air spring unit is generally cylindrical or tubular in shape and comprises an inner tubular wall portion 41 and an outer tubular wall portion 42, both wall portions being of a resilient flexible material, such as fabric reinforced rubber or other rubber-like material, that is impervious to air or gas, or substantially so over a reasonable length of time. These wall portions 41 and 42 are connected by a return bend portion 43 that is integral with the tubular wall portions 41 and 42 and is formed by these portions on relative reciprocation between the inner and the outer wall portions 41 and 42. Thus the tubular walls 41 and 42 form a dual-walled tubular structure that is closed at one end by the return bend portion 43 and is open at the opposite end to provide the free end portions 44 and 45. These free end portions 44 and 45 extend toward the same end of the tubular wall structure, as shown in FIGURE 1 of the drawing.

The reservoir tube 26 has a necked-down or reduced diameter portion 48 disposed near the end of the reservoir tube 26 as secured to the closure cap 18. This reduced diameter portion 48 of the reservoir tube forms a truncated conical wall portion that is engaged by the free end 44 of the inner wall 41 of the flexible tubular wall structure 40.

To secure the end portion 44 of the wall 41 to the reservoir tube 26 in a fluid-tight sealing engagement, a nonelastic metal band 50 is positioned around the end wall portion 44 to frictionally retain the end portion in frictional engagement with the reservoir tube 26 at the truncated wall portion 48. Since the nonelastic metal band 50 is of lesser diameter than the diameter of the reservoir tube 26 plus the thickness of the wall 41 of the tubular structure 40, pressure applied to the interior of the tubular structure 40 will tend to move the wall 41 axially downwardly away from the rod seal 16 and thereby increase the frictional engagement of the end wall portion 44 with the reservoir wall portion 48 and secure a fluid-tight engagement that increases in proportion to the fluid pressure, that is air pressure, within the air spring 40.

The rod 13 carries a cup-shaped cap member 60 on the end thereof that projects through the closure wall 18 of the shock absorber and is held on the rod by a fluid-tight seal or weld joint 61. This cap 60 has an annular wall 62 that extends axially of the shock absorber with the open end thereof adapted to surround the inner end wall 44 when the shock absorber is in the fully collapsed position as shown in FIGURE 1. This cap 60, or the flange portion 62 thereof has an annular conical surface in the form of a truncated cone 63 that is engaged by the end wall portion 45 of the outer wall 42 of the tubular structure 40.

Figure 2:
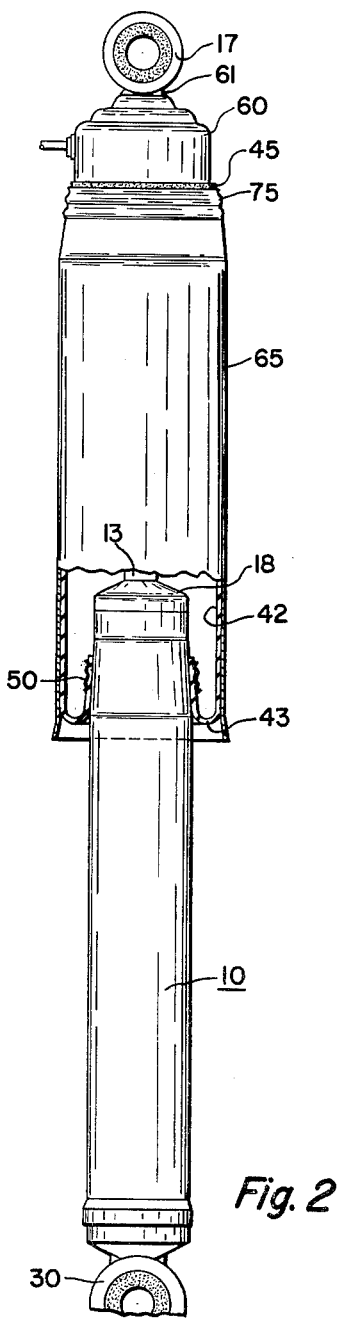
FIGURE 2 is a cross-sectional view of the shock absorber shown in FIGURE 1, but with the air spring and the shock absorber itself shown in elevation, the shock absorber being shown in the fully extended position.

The tubular guide or support skirt 65 is positioned coaxial of the reservoir tube 26 and extends longitudinally thereof substantially the full length of the shock absorber, as shown in FIGURE 1, when the shock absorber is in the fully collapsed position, and is of a length at least equal to the length of the outer wall 42 of the tubular air spring structure 40 when the cap member 60 is in the most remote position from the shock absorber in the fully extended position thereof, as shown in FIGURE 2. The guide or tubular wall 65 will therefore provide for full support of the tubular wall structure in the full stroke of reciprocation of the shock absorber from the complete collapsed position as shown in FIGURE 1 to the fully extended position as shown in FIGURE 2, the outer wall 42 being sleeved within and supported on the support or guide skirt 65 while the inner wall 41 is sleeved upon or guided on the reservoir tube 26 of the shock absorber. When fluid under pressure is admitted through the fitting connection 70 into the chamber 71 of the air spring portion of the combination unit, the major areas of the resilient flexible tubular structure 40 are supported by rigid structures, such as the skirt 65 or the reservoir tube 26, in all positions of the two parts relative to one another in all positions of reciprocation of the shock absorber. Thus high fluid pressures introduced internally into the chamber 71 will not have an adverse effect on the walls 41 and 42 tending to "balloon" the wall structure and will prevent the wall structure from rupture by giving it full support, except for the return bend section 43 which normally has sufficient strength to resist normal fluid pressures in the chamber 71, and even some excessive pressures.

The guide support skirt 65 has a band portion 75 at the upper end thereof adjacent the cap 60 that frictionally engages the end wall 45 of the wall 42 to frictionally retain the wall 45 on the truncated surface 63 of the cap 60 and thereby provide a fluid-tight seal between the cap 60 and the wall 42. Obviously, fluid pressure in the chamber 71 will tend to move the wall 42 downwardly away from the cap 60 and thereby increase the friction engagement of the wall end portion 45 with the truncated portion 63 of the cap 60 to increase the sealing pressure in proportion to the fluid pressure in the chamber 71.

The ring or band portion 75 of the skirt 65 thereby positions the support and guide skirt on the cap 60 so that it reciprocates with the cap during reciprocation of the rod 13 relative to the pressure cylinder 11 of the shock absorber.

While the embodiments of the persent invention as herein disclosed constitute a preferred form, it is to be understood that other forms might be adopted.

What is claimed is as follows:

1. A shock absorber and air spring unit assembly, comprising, a hydraulic direct-acting tubular shock absorber including a tubular pressure cylinder, a piston disposed in said pressure cylinder slidably fitting the same and having ports providing for hydraulic fluid flow through the piston between cylinder chambers at opposite sides of the piston during reciprocation thereof in said cylinder, valve means on each of opposite sides of said piston to control hydraulic fluid flow from one side of the piston to the other, a reservoir tube concentrically surrounding said cylinder tube in spaced relation thereto and forming therewith a reservoir space, valve means closing one end of said pressure cylinder and providing for hydraulic fluid flow in both directions between said pressure cylinder and said reservoir space, wall means closing the end of said reservoir tube adjacent said pressure cylinder valve means, a piston rod connected to said piston and having a portion extending beyond the opposite ends of said tubes, wall means closing said opposite ends and through which said rod slidably extends, a cup-shaped cap member secured to said extending portion of said rod adjacent the said opposite ends of said tubes and exterior thereof with the open end of the cap member directed toward the shock absorber, a guide skirt tube concentrically surrounding said reservoir tube in spaced relation thereto and having one end encircling the said open end of said cap member and extending substantially the full length of the shock absorber when in collapsed position, a resilient tubular wall unit having an inner tubular wall sleeved over said reservoir tube and an outer tubular wall sleeved within said guide skirt tube with the inner wall and the outer wall integrally connected by a return bend of wall portion formed by the inner and outer wall on relative reciprocation therebetween and with said inner and outer tubular walls having their free ends at the same end of the said unit, means securing the free end of said inner wall to said reservoir tube, said free end of said outer wall being positioned between said end of said cap member and said one end of said guide skirt frictionally securing thereby the free end of said outer wall between said cap member and said one end of said guide skirt.

2. A shock absorber and air spring unit assembly, comprising, a hydraulic direct-acting tubular shock absorber including a tubular pressure cylinder, a piston disposed in said pressure cylinder slidably fitting the same and having ports providing for hydraulic fluid flow through the piston between cylinder chambers at opposite sides of the piston during reciprocation thereof in said cylinder, valve means on each of opposite sides of said piston to control hydraulic fluid flow from one side of the piston to the other, a reservoir tube concentrically surrounding said cylinder tube in spaced relation thereto and forming therewith a reservoir space, valve means closing one end of said pressure cylinder and providing for hydraulic fluid flow in both directions between said pressure cylinder and said reservoir space, wall means closing the end of said reservoir tube adjacent said pressure cylinder valve means, a piston rod connected to said piston and having a portion extending beyond the opposite ends of said tubes, wall means closing said opposite ends and through which said rod slidably extends, a cup-shaped cap member secured to said extending portion of said rod adjacent the said opposite ends of said tubes and exterior thereof with the open end of the cap member directed toward the shock absorber and having an annular outer peripheral surface portion in the form of a truncated cone with the base end thereof positioned toward the shock absorber, a guide skirt tube concentrically surrounding said reservoir tube in spaced relation thereto and having one end encircling the said surface portion, a resilient tubular wall unit having an inner tubular wall sleeved over said reservoir tube and an outer tubular wall sleeved within said guide skirt tube with the inner wall and the outer wall integrally connected by a return bend wall portion formed by the inner and the outer wall on relative reciprocation therebetween and with said inner and outer tubular walls having their free ends at the same end of said unit, said free end of said outer wall being positioned between said peripheral surface portion and said one end of said guide skirt tube with said one end of said guide skirt securing thereby said free end of said outer wall upon said peripheral surface portion and between the same and said one end of said guide skirt, said guide skirt tube having an axial length at least equal to the axial length of said outer tubular wall of said resilient tubular wall unit with said cap member disposed in its most remote position from said pressure cylinder in the full extended position of the shock absorber providing thereby a support and guide member for the said outer wall, said reservoir tube supporting and guiding said inner wall whereby both said inner and outer walls are fully supported and guided in the full stroke of reciprocation of the shock absorber, and means securing the free end of said inner wall to said reservoir tube.

3. A shock absorber and air spring unit assembly constructed and arranged in accordance with that set forth in claim 2 in which said one end of said guide tube has an inner peripheral surface portion in the form of a truncated cone that is a cooperating counterpart of the said surface portion on said cap member and secures thereby said outer wall between said cap member and said one end of said guide skirt.

4. A shock absorber and air spring unit assembly constructed and arranged in accordance with that set forth in claim 2 which includes, a nonelastic annular ring frictionally engaging said inner wall at the free end thereof securing the free end of said inner wall to said reservoir tube, said one end of said guide skirt forming a nonelastic annular ring securing thereby the said outer wall to said cap and between said guide skirt and said cap.

References Cited in the file of this patent

UNITED STATES PATENTS

| 2,467,098 | Rossman | Apr. 12, 1949 |
| 2,916,296 | Muller | Dec. 8, 1959 |

FOREIGN PATENTS

| 214,922 | Australia | May 2, 1950 |
| 218,802 | Australia | Nov. 21, 1958 |